US012769767B2

(12) United States Patent
Wang et al.

(10) Patent No.: US 12,769,767 B2
(45) Date of Patent: Oct. 20, 2026

(54) MULTI-ROUND DIALOGUE PROCESSING METHOD AND APPARATUS, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Meng Wang, Beijing (CN); Weidong Zhang, Beijing (CN); Gaojun Wang, Beijing (CN); Yan Xiao, Beijing (CN); Jun Ji, Beijing (CN); Lishan Yang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 530 days.

(21) Appl. No.: 18/057,016

(22) Filed: Nov. 18, 2022

(65) Prior Publication Data

US 2023/0306048 A1 Sep. 28, 2023

(30) Foreign Application Priority Data

Mar. 28, 2022 (CN) ......................... 202210314564.7

(51) Int. Cl.
*G06F 16/3329* (2025.01)
*G06F 16/31* (2019.01)
(Continued)

(52) U.S. Cl.
CPC ........ *G06F 16/3329* (2019.01); *G06F 16/322* (2019.01)

(58) Field of Classification Search
CPC ...... G06F 40/30; G06F 16/3329; G06F 40/35; G06F 40/56; G06F 16/9032;
(Continued)

(56) References Cited

U.S. PATENT DOCUMENTS 11,442,992 B1 * 9/2022 Moon ............... G06F 16/90332
2013/0262501 A1 * 10/2013 Kuchmann-Beauger .................... G06F 16/24535 707/769

(Continued)

FOREIGN PATENT DOCUMENTS

CN 105786798 A 7/2016
CN 108121799 A 6/2018

(Continued)

OTHER PUBLICATIONS

Vu Le, Sumit Gulwani, and Zhendong Su. SmartSynth: synthesizing smartphone automation scripts from natural language. In Proceeding of the 11th annual international conference on Mobile systems, applications, and services (MobiSys '13). Association for Computing Machinery, New York, NY, USA, 193-206. (Year: 2013).*

(Continued)

*Primary Examiner* — Richemond Dorvil
*Assistant Examiner* — Rodrigo A Chavez
(74) *Attorney, Agent, or Firm* — Kwan & Olynick LLP

(57) ABSTRACT

Multi-round dialogue processing solution is disclosed and relates to the field of artificial intelligence, such as intelligent voices, deep learning, natural language processing. The method may include: acquiring a first query input by a user in a current round dialogue, and identifying an intention of the first query; determining a scenario corresponding to the identified intention, determining a node matched with the first query in a node tree corresponding to the scenario, and determining a recommended script according to the matched node; acquiring a reply script corresponding to the first query and a guide script corresponding to the first query; and generating a reply corresponding to the first query according to the acquired reply script, guide script and recommendation script.

14 Claims, 3 Drawing Sheets

(51) Int. Cl.

| | |
|---|---|
| ***G06F 40/30*** | (2020.01) |
| ***G06F 40/35*** | (2020.01) |
| ***G06F 40/56*** | (2020.01) |

(58) Field of Classification Search

CPC ............. G06F 16/903; G06F 16/90332; G06F 16/322; G06F 16/338; G06F 40/20

USPC ........................................................ 704/9, 275

See application file for complete search history.

(56) References Cited

U.S. PATENT DOCUMENTS

| | | | | |
|---|---|---|---|---|
| 2018/0052913 | A1* | 2/2018 | Gaskill | G06N 5/04 |
| 2018/0314689 | A1* | 11/2018 | Wang | G10L 15/1822 |
| 2018/0349755 | A1* | 12/2018 | Gao | G06N 3/006 |
| 2018/0373696 | A1* | 12/2018 | Terry | G06F 40/289 |
| 2018/0373965 | A1* | 12/2018 | He | G10L 15/22 |
| 2019/0057157 | A1* | 2/2019 | Mandal | G06F 16/9038 |
| 2021/0050006 | A1* | 2/2021 | Andreas | G06F 40/174 |
| 2021/0073474 | A1* | 3/2021 | Sengupta | G06F 40/247 |
| 2021/0117214 | A1* | 4/2021 | Presant | H04L 67/60 |
| 2021/0160373 | A1* | 5/2021 | Mcgann | G06Q 30/015 |
| 2021/0216594 | A1 | 7/2021 | Fan et al. | |
| 2021/0406291 | A1* | 12/2021 | Mazars | G06F 16/3329 |
| 2022/0253611 | A1* | 8/2022 | Galitsky | G06N 3/09 |
| 2022/0382752 | A1* | 12/2022 | Yadav | G06F 16/245 |
| 2022/0382993 | A1* | 12/2022 | Lewis | G06N 5/041 |
| 2022/0414228 | A1* | 12/2022 | Difonzo | G06F 40/169 |
| 2023/0134933 | A1* | 5/2023 | Lee | G06N 3/08 706/45 |

FOREIGN PATENT DOCUMENTS

| | | | |
|---|---|---|---|
| CN | 109447819 | A | 3/2019 |
| CN | 110287299 | A | 9/2019 |
| CN | 110297616 | A | 10/2019 |
| CN | 111382241 | A | 7/2020 |
| CN | 111651572 | A | 9/2020 |
| CN | 111737408 | A | 10/2020 |
| CN | 111737444 | A | 10/2020 |
| CN | 111753061 | A | 10/2020 |
| CN | 112214578 | A | 1/2021 |
| CN | 112597292 | A | 4/2021 |
| CN | 113918712 | A | 1/2022 |
| CN | 114186036 | A | 3/2022 |
| CN | 114218375 | A | 3/2022 |
| KR | 20220011083 | A | 1/2022 |

OTHER PUBLICATIONS

Extended European Search Report for EP22208777.7, issued on Jun. 27, 2023, 38 pgs.

First office action for CN202210314564.7, issued on May 16, 2023, 18 pgs.

Lyu Shining, et al., Research on Intelligent Customer Service Dialogue Systems Integrating Neural Networks and Electric Power Field Knowledge, Aug. 31, 2020, 8 pgs.

Notice of allowance for CN202210314564.7, issued on Aug. 16, 2023, 5 pgs.

* cited by examiner

MULTI-ROUND DIALOGUE PROCESSING METHOD AND APPARATUS, ELECTRONIC DEVICE AND STORAGE MEDIUM

The present disclosure claims the priority and benefit of Chinese Patent Application No. CN202210314564.7, filed on Mar. 28, 2022, entitled "MULTI-ROUND DIALOGUE PROCESSING METHOD AND APPARATUS, ELECTRONIC DEVICE AND STORAGE MEDIUM". The disclosure of the above application is incorporated herein by reference in its entirety.

TECHNICAL FIELD

The present disclosure relates to the field of artificial intelligence technologies, particularly to the fields of intelligent voices, deep learning, natural language processing, and more particularly to a multi-round dialogue processing method and apparatus, an electronic device and a storage medium.

BACKGROUND

With the development of natural language processing technologies, or the like, a multi-round dialogue system is widely applied to scenarios, such as intelligent customer service, intelligent outbound calls, or the like.

Usually, a current multi-round dialogue system has a single round dialogue capability, dialogue interaction is completed according to a preset flow, and both intelligence and fluency are poor.

SUMMARY

The present disclosure provides a multi-round dialogue processing method, an electronic device and a storage medium.

A multi-round dialogue processing method includes:

- acquiring a first query input by a user in a current round dialogue, and identifying an intention of the first query;
- determining a scenario corresponding to the identified intention, determining a node matched with the first query in a node tree corresponding to the scenario, and determining a recommended script according to the matched node;
- acquiring a reply script corresponding to the first query and a guide script corresponding to the first query; and
- generating a reply corresponding to the first query according to the reply script, the guide script and the recommendation script.

An electronic device includes:

- at least one processor; and a memory connected with the at least one processor communicatively;
- wherein the memory stores instructions executable by the at least one processor to enable the at least one processor to perform the method as mentioned above.

There is provided a non-transitory computer readable storage medium with computer instructions stored thereon, wherein the computer instructions are used for causing a computer to perform the method as mentioned above.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings.

DETAILED DESCRIPTION OF EMBODIMENTS

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

In addition, it should be understood that the term "and/or" only describes an association relationship between associated objects, and indicates that three relationships may exist. For example, A and/or B may indicate three cases: only A exists; both A and B exist; and only B exists. In addition, in this specification, the symbol "/" generally indicates that associated objects have a relationship of "or".

Figure 1:
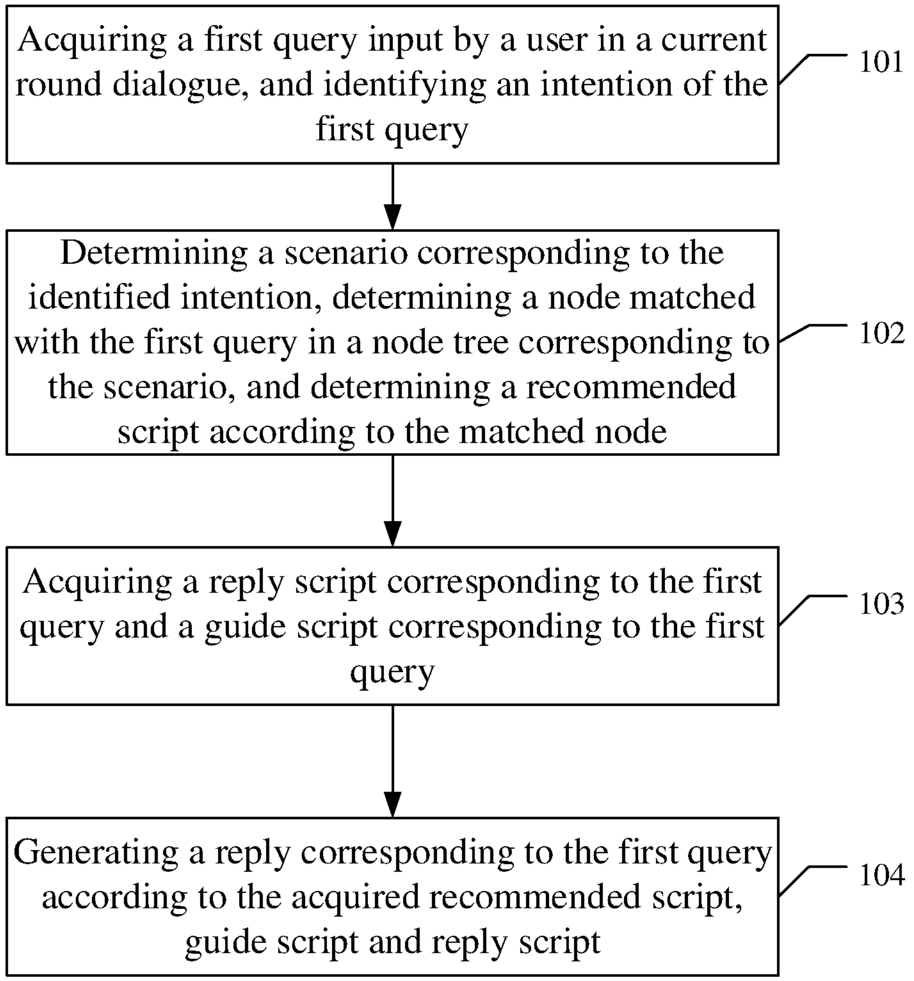
FIG. 1 is a flow chart of a multi-round dialogue processing method according to a first embodiment of the present disclosure.

FIG. 1 is a flow chart of a multi-round dialogue processing method according to a first embodiment of the present disclosure. As shown in FIG. 1, the method includes the following implementation steps:

- step 101: acquiring a first query input by a user in a current round dialogue, and identifying an intention of the first query;
- step 102: determining a scenario corresponding to the identified intention, determining a node matched with the first query in a node tree corresponding to the scenario, and determining a recommended script according to the matched node;
- step 103: acquiring a reply script corresponding to the first query and a guide script corresponding to the first query; and
- step 104: generating a reply corresponding to the first query according to the recommended script, guide script and reply script acquired.

With the solution of the above method embodiment, possible requirements of the user may be pre-judged, and corresponding guidance and recommendation are performed, thereby improving intelligence and fluency of the dialogue.

In a process of a human-machine dialogue, one question-and-answer session between the user and a robot is called one round dialogue.

In each round dialogue, the intention of a query input by the user may be identified first. In order to distinguish from other subsequent queries, the query is referred to as the first query.

The intention refers to a business action, or the like, to be completed required by the user, such as a financial recommendation, which is similar to a function in codes. A method for identifying the intention of the first query is not limited, and for example, usually, the first query is in a voice form, and may be identified as text first, and then, the intention of the text may be identified using a pre-trained intention identification model.

Further, whether the intention is identified may be determined; that is, whether the user expresses the intention in the first query is determined, if no, the reply corresponding to the first query may be generated in an existing manner and fed back to the user, and if yes, the scenario corresponding to the identified intention may be determined. For example, the reply corresponding to the first query may be generated in a rule-based manner or in a retrieval matching manner, or the like.

Scenarios corresponding to different intentions may be pre-constructed, and each scenario may include (that is, correspond to) one node tree; that is, plural nodes are organized in a tree structure, each node processes corresponding dialogue logic, and the nodes included in each scenario, jump relationships among different nodes, or the like, may be determined according to actual requirements.

Each node has its own node entry condition, such as an intention, an entity content, an entity attribute, or the like. The node entry condition may also be referred to as a node trigger condition, i.e., a condition triggering the node.

The entity content refers to parameters required for completing the business action, or the like, such as a financial product, which are similar to parameters in a function, and one intention and plural entity contents may complete handling of one business. The entity attribute refers to an attribute of an entity, such as a sale starting date, a threshold amount, a yield rate, or the like, of the financial product.

Correspondingly, for the first query, after the corresponding scenario is determined, the node matched with the first query in the scenario may be further determined.

The node matched with the first query refers to a node with the node trigger condition matched with the first query. For example, if an entity content expressed in the first query is the same as the entity content in the node trigger condition of a certain node, the node may be considered as the node matched with the first query; for another example, if an entity attribute expressed in the first query is the same as the entity attribute in the node trigger condition of a certain node, the node may be considered as the node matched with the first query.

A number of the matched nodes may be 1 or greater than 1. According to the matched nodes, the recommended script may be determined.

Before this, whether a recommendation function is enabled may be determined first (the user may select whether to enable the function by himself), if no, the reply corresponding to the first query may be generated in the existing manner and fed back to the user, and if yes, the recommended script may be determined according to the matched nodes.

In one embodiment of the present disclosure, if the number of the matched nodes is 1, the matched node may be taken as a to-be-identified node, and if the number of the matched nodes is greater than 1, the last node in the matched nodes may be taken as the to-be-identified node, and the last node is a node to which a process finally jumps according to the jump relationship between the nodes, and correspondingly, the recommended script may be generated according to the to-be-identified node.

For example, the number of the matched nodes is 3, and for convenience of description, the 3 matched nodes are referred to as node 1, node 2 and node 3 respectively; node 2 is a subnode of node 1, node 3 is a subnode of node 2, and according to the jump relationship between the nodes, the node to which the process jumps finally is node 3, and then, node 3 is the last node.

In one embodiment of the present disclosure, whether the to-be-identified node meets a recommendation condition may be judged, and the recommended script may be generated according to the to-be-identified node under a condition that the to-be-identified node meets the recommendation condition.

In one embodiment of the present disclosure, the to-be-identified node meets the recommendation condition in the case that the to-be-identified node includes at least two subnodes meeting requirements, and a subnode of the subnodes meets requirement in the case of: an intention corresponding to the subnode is matched with the intention corresponding to the first query, and/or an entity corresponding to the subnode is matched with an entity corresponding to the first query, the entity including an entity attribute and/or an entity content. For example, if subnode x corresponds to a certain entity attribute, and the first query expresses the entity attribute, the subnode x may be considered as a subnode meeting requirements.

For any node, the node trigger condition may be an intention, an entity content or an entity attribute, or may be any other condition, such as an expression, or the like.

For example, if the to-be-identified node includes at least two subnodes with the node trigger condition being the intention, the entity content, or the entity attribute, the to-be-identified node may be considered to meet the recommendation condition.

With the above processing, the nodes meeting the recommendation condition may be determined efficiently and accurately, such that a good foundation is laid for subsequent processing, and even if the recommendation condition is not met, the reply corresponding to the first query may also be generated in the existing manner, thereby incorporating the existing implementation, and guaranteeing a timely reply to the user under various conditions.

In one embodiment of the present disclosure, during generation of the recommendation script, if the to-be-identified node corresponds to an empty recommendation list, a script content corresponding to each subnode meeting requirements may be acquired, and the recommendation list may be formed with all script contents acquired, such that the recommended script may be generated according to the recommendation list; if the recommendation list corresponding to the to-be-identified node is not empty, the recommended script may be generated directly according to the recommendation list.

In one embodiment of the present disclosure, when the recommendation list is formed by the acquired script contents, the acquired script contents may be ranked according to a predetermined arrangement order of the corresponding subnodes in the subnodes of the to-be-identified node, and the recommendation list is formed by the ranked script contents.

For example, the acquired script contents may be ranked according to a principle that the corresponding subnodes with positions in the subnodes of the to-be-identified node closer to the left are ranked higher.

Figure 2:
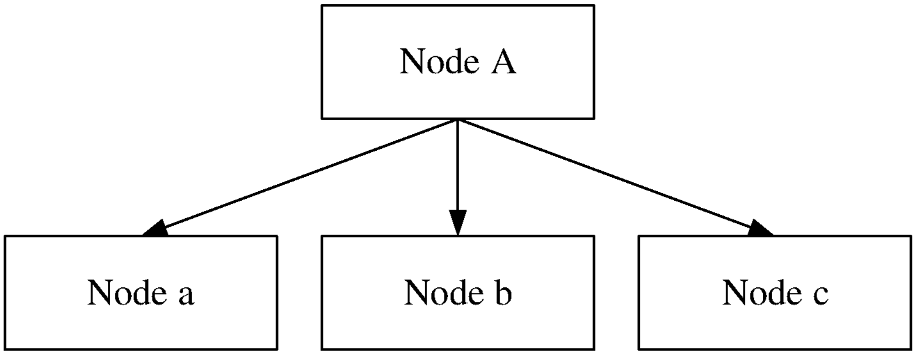
FIG. 2 is a schematic diagram of a relationship between a to-be-identified node and a subnode thereof in the present disclosure.

FIG. 2 is a schematic diagram of a relationship between the to-be-identified node and the subnode thereof in the present disclosure. As shown in FIG. 2, assuming that the to-be-identified node is node A and includes 3 subnodes which are node a, node b and node c respectively, and assuming that node a, node b and node c are all subnodes meeting requirements, script contents corresponding to node a, node b and node c may be acquired, and the acquired script contents may be ranked according to a left-to-right sequence of node a, node b and node c; that is, the script content corresponding to node a is ranked first, the script content corresponding to node b is ranked second, the script content corresponding to node c is ranked third, and then, a recommendation list corresponding to node A may be formed by the ranked script contents.

Each node may correspond to one script content. A method for acquiring the script content corresponding to each node is not limited; for example, for any node, the script content corresponding to the node may be generated based on the node trigger condition of the node; for example, the node trigger condition or an alias of the node trigger condition may be used as the script content corresponding to the node.

Correspondingly, in one embodiment of the present disclosure, during generation of the recommended script according to the recommendation list, the recommended script including each script content in the recommendation list may be generated, and a sequence of the script contents in the recommended script is the same as a ranking sequence of the script contents in the recommendation list.

With the above processing, the script content ranked higher in the recommendation list is more preferentially recommended, thereby improving a recommendation effect.

In addition to the recommendation script, the reply script corresponding to the first query and the guide script corresponding to the first query are required to be acquired. The guide script is used to guide subsequent scripts. The reply script refers to the reply corresponding to the first query generated in the existing manner.

In one embodiment of the present disclosure, one guide script may be selected randomly from at least one preset guide script as the guide script corresponding to the first query, such that the implementation is quite flexible and convenient; the preset guide script may be used directly, thereby saving processing time and improving a processing efficiency.

Further, the reply corresponding to the first query may be generated according to the acquired reply script, guide script and recommendation script; that is, a final reply is generated.

In one embodiment of the present disclosure, the reply script, the guide script and the recommended script may be spliced according to a sequence of the reply script, the guide script and the recommendation script, so as to obtain the reply corresponding to the first query; the reply is fed back to the user, and the current round dialogue is ended.

For example, in a financial recommendation scenario, after generating a reply script of a financial product consulted by the user, the robot may splice a corresponding guide script and recommended script on this basis, so as to obtain a final reply as follows: *product is a latest high-income financial product launched by our bank, . . . , and you may also want to know a sale starting time, . . . , a threshold amount. "*product is a latest high-income financial product launched by our bank" is a reply script, "you may also want to know" is a guide script, and "a sale starting time, . . . , a threshold amount" is a recommendation script.

With the above processing, the final reply simultaneously includes various kinds of information, such as reply information, guide information, recommendation information, or the like, such that contents of the final reply are enriched, and effective guide and recommendation may be performed on the user, thus improving a business handling efficiency, or the like.

In one embodiment of the present disclosure, a second query input by the user in a next round dialogue after the current round dialogue may also be acquired, and subnodes matched with the second query in the subnodes meeting requirements may be determined; correspondingly, a number of hits corresponding to the subnodes matched with the second query may be increased, an initial number of hits of the subnodes meeting requirements is 0, and then, the script contents in the recommendation list may be ranked in a descending order of the number of hits.

It is assumed that after the final reply "*product is a latest high-income financial product launched by our bank, . . . , and you may also want to know a sale starting time, . . . , a threshold amount" is fed back to the user, the second query input by the user in the next round dialogue expresses the desire to know "threshold amount", assuming that "threshold amount" corresponds to node b shown in FIG. 2**, a number of hits corresponding to node b may be increased; for example, the number of hits may be increased by 1, and further, the sequence of the script contents in the recommendation list formed by the script content corresponding to node a, the script content corresponding to node b, and the script content corresponding to node c may be adjusted in the descending order of the number of hits, so as to obtain the updated recommendation list corresponding to node A.

With the above processing, the recommendation list may be updated in time, such that the script contents in the recommendation list are ranked more reasonably, thereby further improving accuracy of the recommended script generated based on the recommendation list.

The above-mentioned updating method of the recommendation list is only an example, and is not used to limit the technical solution of the present application, and other updating methods, such as manual active intervention, or the like, may also be used.

Figure 3:
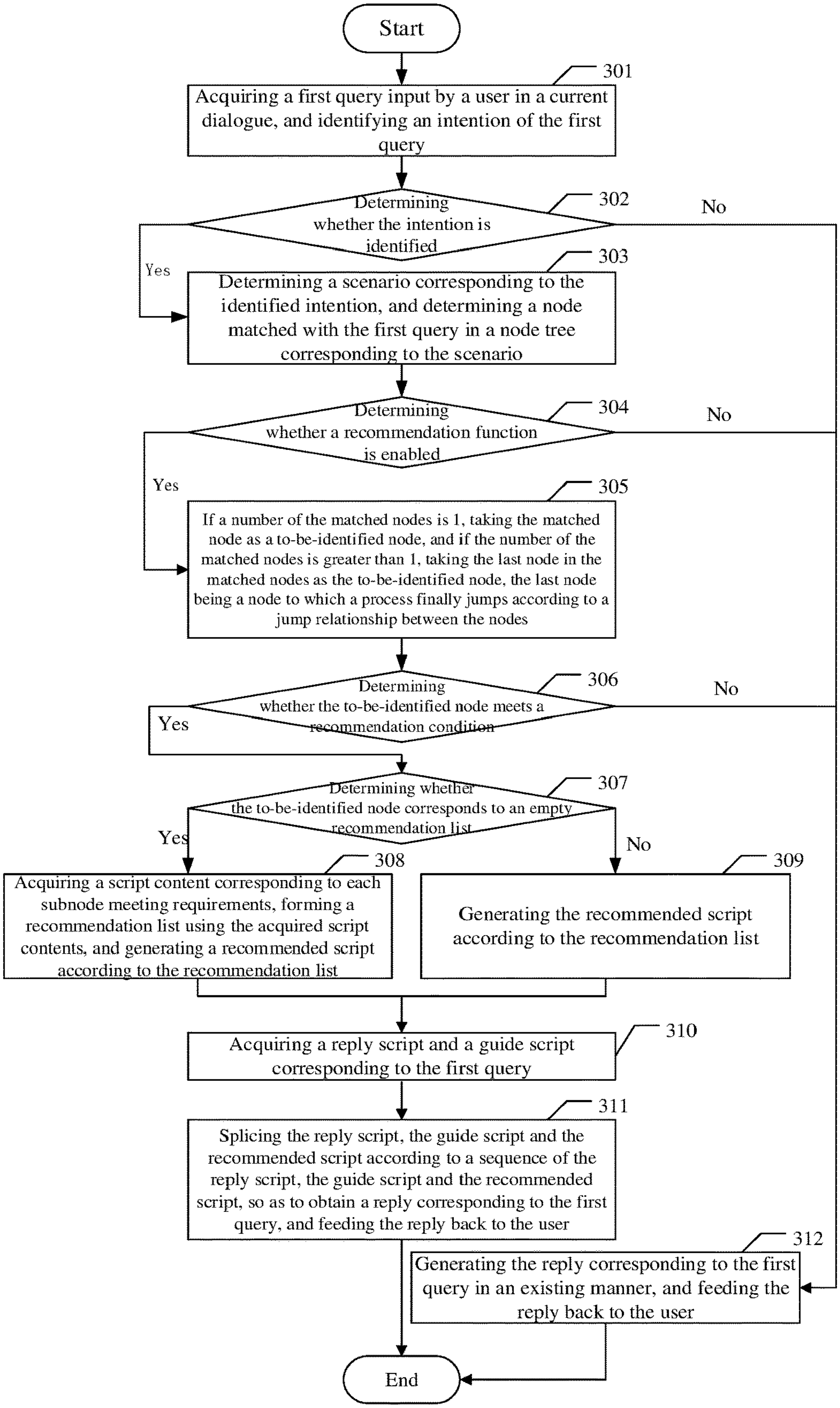
FIG. 3 is a flow chart of a multi-round dialogue processing method according to a second embodiment of the present disclosure.

Based on the above-mentioned description, FIG. 3 is a flow chart of a multi-round dialogue processing method according to a second embodiment of the present disclosure. As shown in FIG. 3, the following processing method may be used for any round dialogue.

Step 301: acquiring a first query input by a user in a current round dialogue, and identifying an intention of the first query.

Step 302: determining whether the intention is identified, if yes, executing step 303, and if no, executing step 312.

Step 303: determining a scenario corresponding to the identified intention, and determining a node matched with the first query in a node tree corresponding to the scenario.

Step 304: determining whether a recommendation function is enabled, if yes, executing step 305, and if no, executing step 312.

Step 305: if a number of the matched nodes is 1, taking the matched node as a to-be-identified node, and if the number of the matched nodes is greater than 1, taking the last node in the matched nodes as the to-be-identified node, the last node being a node to which a process finally jumps according to a jump relationship between the nodes.

Step 306: determining whether the to-be-identified node meets a recommendation condition, if yes, executing step 307, and if no, executing step 312.

Step 307: determining whether the to-be-identified node corresponds to an empty recommendation list, if yes, executing step 308, and if no, executing step 309.

Step 308: acquiring a script content corresponding to each subnode meeting requirements, forming a recommendation list using the acquired script contents, generating a recommended script according to the recommendation list, and then, executing step 310.

When the recommendation list is formed by the acquired script contents, the acquired script contents may be ranked according to a principle that the corresponding subnodes with positions in the subnodes of the to-be-identified node closer to the left are ranked higher, and the recommendation list is formed by the ranked script contents.

Correspondingly, during generation of the recommended script according to the recommendation list, the recommended script including each script content in the recommendation list may be generated, and a sequence of the script contents in the recommended script is the same as a ranking sequence of the script contents in the recommendation list.

Step 309: generating the recommended script according to the recommendation list, and then, executing step 310.

Step 310: acquiring a reply script corresponding to the first query and a guide script corresponding to the first query.

For example, one guide script may be selected randomly from at least one preset guide script as the guide script corresponding to the first query.

Step 311: splicing the reply script, the guide script and the recommended script according to a sequence of the reply script, the guide script and the recommendation script, so as to obtain a reply corresponding to the first query, feeding the reply back to the user, and then ending the process.

Step 312: generating the reply corresponding to the first query in an existing manner, feeding the reply back to the user, and then ending the process.

In addition, after a second query input by the user in a next round dialogue is acquired, subnodes matched with the second query in the subnodes meeting requirements may also be determined, a number of hits corresponding to the subnodes matched with the second query may be increased, and then, the script contents in the recommendation list may be ranked in a descending order of the number of hits.

It should be noted that for simplicity of description, all the above-mentioned embodiments of the method are described as combinations of a series of acts, but those skilled in the art should understand that the present disclosure is not limited by the described order of acts, as some steps may be performed in other orders or simultaneously according to the present disclosure. Further, those skilled in the art should also understand that the embodiments described in this specification are preferred embodiments and that acts and modules referred to are not necessary for the present disclosure. In addition, for parts that are not described in detail in a certain embodiment, reference may be made to the related descriptions of other embodiments.

In conclusion, with the solution of the above method embodiment of the present disclosure, possible requirements of the user may be pre-judged, and corresponding guidance and recommendation are performed, thereby improving intelligence and fluency of the dialogue and improving the business handling efficiency; the solution is easy to implement, that is, has a low implementation cost, may be applied to different scenarios, and has wide applicability.

The above is a description of an embodiment of the method, and an embodiment of an apparatus according to the present disclosure will be further described below.

Figure 4:
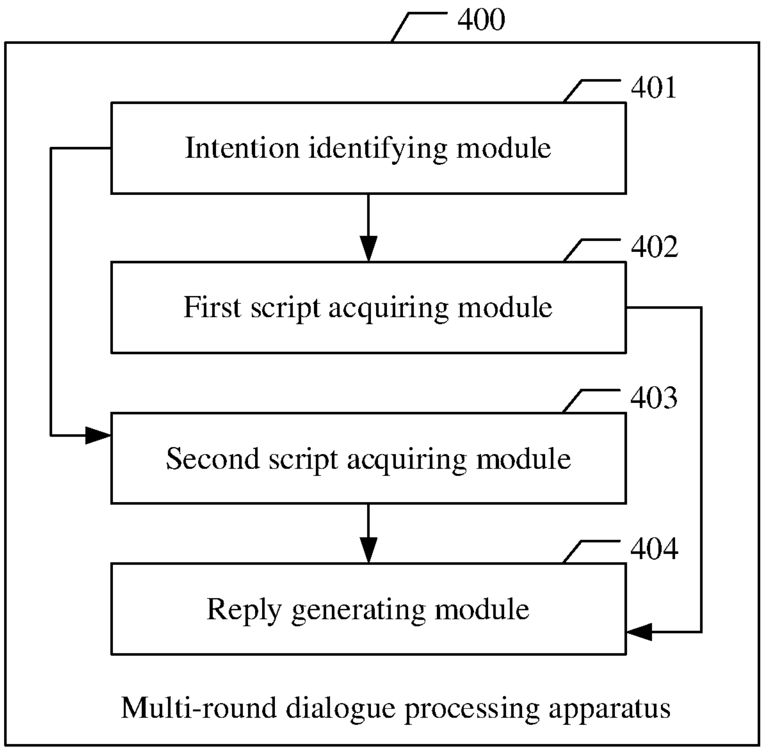
FIG. 4 is a schematic structural diagram of a multi-round dialogue processing apparatus 400 according to an embodiment of the present disclosure.

FIG. 4 is a schematic structural diagram of a multi-round dialogue processing apparatus 400 according to an embodiment of the present disclosure. As shown in FIG. 4, the multi-round dialogue processing apparatus includes:

an intention identifying module 401 configured to acquire a first query input by a user in a current round dialogue, and identify an intention of the first query;

a first script acquiring module 402 configured to determine a scenario corresponding to the identified intention, determine a node matched with the first query in a node tree corresponding to the scenario, and determine a recommended script according to the matched node;

a second script acquiring module 403 configured to acquire a reply script corresponding to the first query and a guide script corresponding to the first query; and a reply generating module 404 configured to generate a reply corresponding to the first query according to the acquired reply script, guide script and recommendation script.

With the solution of the above apparatus embodiment, possible requirements of the user may be pre-judged, and corresponding guidance and recommendation are performed, thereby improving intelligence and fluency of the dialogue.

In each round dialogue, the intention identifying module 401 may identify the intention of a query input by the user first.

The first script acquiring module 402 may determine the scenario corresponding to the identified intention. Scenarios corresponding to different intentions may be pre-constructed, and each scenario may correspond to one node tree; that is, plural nodes are organized in a tree structure, each node processes corresponding dialogue logic, and the nodes included in each scenario, jump relationships among different nodes, or the like, may be determined according to actual requirements. Each node has its own node entry condition.

After determining the corresponding scenario, the first script acquiring module 402 may further determine the nodes in the scenario matched with the first query. The node matched with the first query refers to a node with the node trigger condition matched with the first query.

A number of the matched nodes may be 1 or greater than 1. According to the matched nodes, the first script acquiring module 402 may determine the recommendation script.

In one embodiment of the present disclosure, if the number of the matched nodes is 1, the first script acquiring module 402 may take the matched node as a to-be-identified node, and if the number of the matched nodes is greater than 1, the first script acquiring module 402 may take the last node in the matched nodes as the to-be-identified node, and the last node is a node to which a process finally jumps according to the jump relationship between the nodes, and correspondingly, the first script acquiring module 402 may generate the recommended script according to the to-be-identified node.

In one embodiment of the present disclosure, the first script acquiring module 402 may judge whether the to-be-identified node meets a recommendation condition, and may generate the recommended script according to the to-be-identified node under a condition that the to-be-identified node meets the recommendation condition.

In one embodiment of the present disclosure, the to-be identified node meets the recommendation condition in the case that the to-be identified node includes at least two subnodes meeting requirement, and a subnode of the subnodes meets requirement in the case of: an intention corresponding to the subnode is matched with the intention corresponding to the first query, and/or an entity corresponding to the subnode is matched with an entity corresponding to the first query, the entity including an entity attribute and/or an entity content.

In one embodiment of the present disclosure, during generation of the recommendation script, if the to-be-identified node corresponds to an empty recommendation list, the first script acquiring module 402 may acquire a script content corresponding to each subnode meeting requirements, form the recommendation list with all script contents acquired, and then generate the recommended script according to the recommendation list; if the recommendation list corresponding to the to-be-identified node is not empty, the first script acquiring module 402 may directly generate the recommended script according to the recommendation list.

In one embodiment of the present disclosure, when the recommendation list is formed by the acquired script contents, the first script acquiring module 402 may rank the acquired script contents according to a predetermined arrangement order of the corresponding subnodes in the subnodes of the to-be-identified node, and form the recommendation list by the ranked script contents.

For example, the acquired script contents may be ranked according to a principle that the corresponding subnodes with positions in the subnodes of the to-be-identified node closer to the left are ranked higher.

Correspondingly, in one embodiment of the present disclosure, during generation of the recommended script according to the recommendation list, the first script acquiring module 402 may generate the recommended script including each script content in the recommendation list, and a sequence of the script contents in the recommended script is the same as a ranking sequence of the script contents in the recommendation list.

The second script acquiring module 403 is required to acquire the reply script and the guide script corresponding to the first query in addition to the recommendation script.

In one embodiment of the present disclosure, the second script acquiring module 403 may select randomly one guide script from at least one preset guide script as the guide script corresponding to the first query.

Further, the reply generating module 404 may generate the reply corresponding to the first query according to the acquired reply script, guide script and recommendation script, that is, generate a final reply.

In one embodiment of the present disclosure, the reply generating module 404 may splice the reply script, the guide script and the recommended script according to a sequence of the reply script, the guide script and the recommendation script, so as to obtain the reply corresponding to the first query, and feed the reply to the user, and the current dialogue is ended.

In one embodiment of the present disclosure, the first script acquiring module 402 may also acquire a second query input by the user in a next round dialogue after the current round dialogue, and determine subnodes matched with the second query in the subnodes meeting requirements; correspondingly, the first script acquiring module 402 may increase a number of hits corresponding to the subnodes matched with the second query, an initial number of hits of the subnodes meeting requirements is 0, and then, the first script acquiring module 402 may re-rank the script contents in the recommendation list in a descending order of the number of hits.

For the specific work flow of the embodiment of the apparatus shown in FIG. 4, reference may be made to the related description in the foregoing embodiment of the method, and details are not repeated.

In conclusion, with the solution of the above apparatus embodiment of the present disclosure, possible requirements of the user may be pre-judged, and corresponding guidance and recommendation are performed, thereby improving intelligence and fluency of the dialogue and improving the business handling efficiency; the solution is easy to implement, that is, has a low implementation cost, may be applied to different scenarios, and has wide applicability.

The solution of the present disclosure may be applied to the field of artificial intelligence, and particularly relates to the fields of intelligent voices, deep learning, natural language processing, or the like. Artificial intelligence is a subject of researching how to cause a computer to simulate certain thought processes and intelligent behaviors (for example, learning, inferring, thinking, planning, or the like) of a human, and includes both hardware-level technologies and software-level technologies. Generally, the hardware technologies of the artificial intelligence include technologies, such as a sensor, a dedicated artificial intelligence chip, cloud computing, distributed storage, big data processing, or the like; the software technologies of the artificial intelligence mainly include a computer vision technology, a voice recognition technology, a natural language processing technology, a machine learning/deep learning technology, a big data processing technology, a knowledge graph technology, or the like.

The query in the embodiment of the present disclosure is not specific to a specific user, and cannot reflect personal information of a specific user, and in addition, the execution subject of the method according to the present disclosure may obtain the query in various public and legal compliance manners, for example, obtain the query from the user after authorization of the user.

In the technical solution of the present disclosure, the collection, storage, usage, processing, transmission, provision, disclosure, or the like, of involved user personal information are in compliance with relevant laws and regulations, and do not violate public order and good customs.

According to the embodiment of the present disclosure, there are also provided an electronic device, a readable storage medium and a computer program product.

Figure 5:
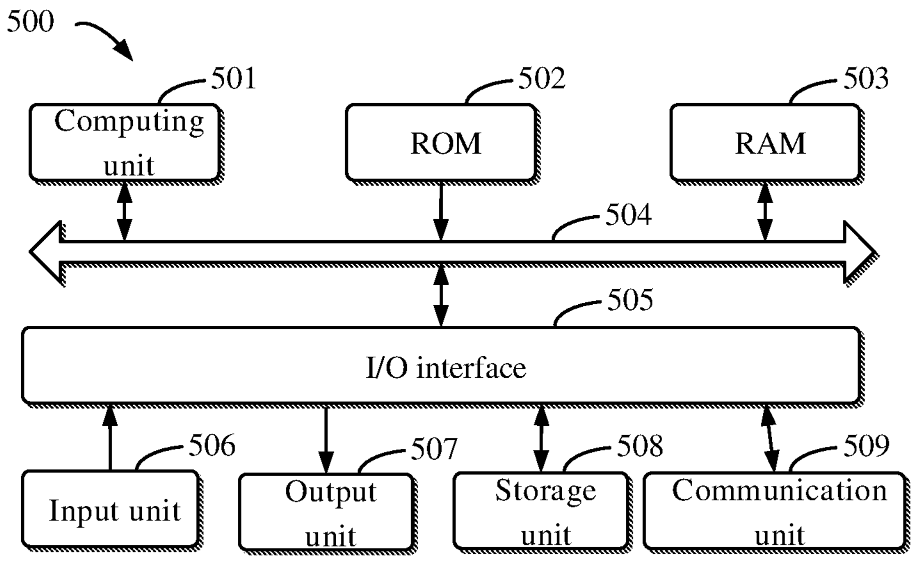
FIG. 5 shows a schematic block diagram of an electronic device 500 which may be configured to implement the embodiment of the present disclosure.

FIG. 5 shows a schematic block diagram of an electronic device 500 which may be configured to implement the embodiment of the present disclosure. The electronic device is intended to represent various forms of digital computers, such as laptop computers, desktop computers, workstations, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 5, the device 500 includes a computing unit 501 which may perform various appropriate actions and processing operations according to a computer program stored in a read only memory (ROM) 502 or a computer program loaded from a storage unit 508 into a random access memory (RAM) 503. Various programs and data necessary for the operation of the device 500 may be also stored in the RAM 503. The computing unit 501, the ROM 502, and the RAM 503 are connected with one other through a bus 504. An input/output (I/O) interface 505 is also connected to the bus 504.

The plural components in the device 500 are connected to the I/O interface 505, and include: an input unit 506, such as a keyboard, a mouse, or the like; an output unit 507, such as various types of displays, speakers, or the like; the storage unit 508, such as a magnetic disk, an optical disk, or the like; and a communication unit 509, such as a network card, a modem, a wireless communication transceiver, or the like. The communication unit 509 allows the device 500 to exchange information/data with other devices through a computer network, such as the Internet, and/or various telecommunication networks.

The computing unit 501 may be a variety of general and/or special purpose processing components with processing and computing capabilities. Some examples of the computing unit 501 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 501 performs the methods and processing operations described above, such as the method according to the present disclosure. For example, in some embodiments, the method according to the present disclosure may be implemented as a computer software program tangibly contained in a machine readable medium, such as the storage unit 508. In some embodiments, part or all of the computer program may be loaded and/or installed into the device 500 via the ROM 502 and/or the communication unit 509. When the computer program is loaded into the RAM 503 and executed by the computing unit 501, one or more steps of the method according to the present disclosure may be performed. Alternatively, in other embodiments, the computing unit 501 may be configured to perform the method according to the present disclosure by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable data processing apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server or a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A multi-round dialogue processing method implemented by a computing device, comprising:

acquiring a first query input by a user in a current round dialogue, and identifying an intention of the first query;

determining a scenario corresponding to the identified intention from scenarios corresponding to different intentions, determining a node matched with the first query in a pre-constructed node tree corresponding to the scenario, the node matched with the first query being a node with a node trigger condition matched with the first query, wherein the pre-constructed node tree includes multiple nodes organized in a tree structure, each node representing a business entity or a business attribute in a service flow in the scenario, with jump relationships between the nodes defining permissible transitions between the business entity and its associated business attributes in a multi-round dialogue, and each node processes a dialogue logic corresponding to the business entity or business attribute;

determining a recommended script according to the matched node, comprising:

determining a to-be-identified node from the matched node, determining whether the to-be-identified node meets a recommendation condition, wherein the recommendation condition is satisfied when the to-be-identified node comprises at least two subnodes that meet a requirement, wherein the requirement comprises at least one of: an intention corresponding to a subnode matching the intention of the first query, or an entity corresponding to a subnode matching an entity of the first query;

in response to the to-be-identified node meeting the recommendation condition, determining whether a recommendation list corresponding to the to-be-identified node is empty, in response to that the recommendation list corresponding to the to-be-identified node is empty, acquiring a script content corresponding to each of the at least two subnodes of the to-be-identified node, forming the recommendation list with all script contents acquired, and generating the recommended script according to the recommendation list; and in response to that the recommendation list corresponding to the to-be-identified node is not empty, generating the recommended script according to the recommendation list, wherein each node corresponds to a script content which is generated based on the node triggering condition of the node;

acquiring a reply script corresponding to the first query and a guide script corresponding to the first query, wherein the guide script is preset; and generating a reply corresponding to the first query according to the reply script, the guide script and the recommended script.

2. The method according to claim 1, wherein the determining the to-be-identified node from the matched node comprises:

if a number of the matched nodes is 1, taking the matched node as the to-be-identified node, and if the number of the matched nodes is greater than 1, taking the last node in the matched nodes as the to-be-identified node, the last node being a node to which a process finally jumps according to a jump relationship between the nodes; and generating the recommended script according to the to-be-identified node.

3. The method according to claim 1, wherein the forming the recommendation list with all script contents acquired comprises: ranking the script contents acquired according to a predetermined arrangement order of the corresponding subnodes in the subnodes of the to-be-identified node, and forming the recommendation list by the ranked script contents; and wherein the generating the recommended script according to the recommendation list comprises: generating the recommended script comprising all script content in the recommendation list, and a sequence of the script contents in the recommended script is the same as a ranking sequence of the script contents in the recommendation list.

4. The method according to claim 3, further comprising:

acquiring a second query input by the user in a next round dialogue after the current round dialogue, and determining subnodes matched with the second query in the subnodes meeting requirements;

increasing a number of hits corresponding to the subnodes matched with the second query, an initial number of hits of the subnodes meeting requirements being 0; and re-ranking the script contents in the recommendation list in a descending order of the number of hits.

5. The method according to claim 1, wherein the acquiring the guide script corresponding to the first query comprises:

selecting randomly one guide script from at least one preset guide script as the guide script corresponding to the first query.

6. The method according to claim 1, wherein the generating the reply corresponding to the first query according to the reply script, the guide script and the recommended script comprises:

splicing the reply script, the guide script and the recommended script to obtain the reply corresponding to the first query.

7. An electronic device, comprising:

at least one processor; and a memory connected with the at least one processor communicatively;

wherein the memory stores instructions executable by the at least one processor to enable the at least one processor to perform a multi-round dialogue processing method comprising:

acquiring a first query input by a user in a current round dialogue, and identifying an intention of the first query;

determining a scenario corresponding to the identified intention from scenarios corresponding to different intentions, determining a node matched with the first query in a pre-constructed node tree corresponding to the scenario, the node matched with the first query being a node with a node trigger condition matched with the first query, wherein the pre-constructed node tree includes multiple nodes organized in a tree structure, each node representing a business entity or a business attribute in a service flow in the scenario, with jump relationships between the nodes defining permissible transitions between the business entity and its associated business attributes in a multi-round dialogue, and each node processes a dialogue logic corresponding to the business entity or business attribute;

determining a recommended script according to the matched node, comprising:

determining a to-be-identified node from the matched node, determining whether the to-be-identified node meets a recommendation condition, wherein the recommendation condition is satisfied when the to-be-identified node comprises at least two subnodes that meet a requirement, wherein the requirement comprises at least one of: an intention corresponding to a subnode matching the intention of the first query, or an entity corresponding to a subnode matching an entity of the first query;

in response to the to-be-identified node meeting the recommendation condition, determining whether a recommendation list corresponding to the to-be-identified node is empty, in response to that the recommendation list corresponding to the to-be-identified node is empty, acquiring a script content corresponding to each of the at least two subnodes of the to-be-identified node, forming the recommendation list with all script contents acquired, and generating the recommended script according to the recommendation list; and in response to that the recommendation list corresponding to the to-be-identified node is not empty, generating the recommended script according to the recommendation list, wherein each node corresponds to a script content which is generated based on the node triggering condition of the node;

acquiring a reply script corresponding to the first query and a guide script corresponding to the first query, wherein the guide script is preset; and generating a reply corresponding to the first query according to the reply script, the guide script and the recommended script.

8. The electronic device according to claim 7, wherein the determining the to-be-identified node from the matched node comprises:

if a number of the matched nodes is 1, taking the matched node as the to-be-identified node, and if the number of the matched nodes is greater than 1, taking the last node in the matched nodes as the to-be-identified node, the last node being a node to which a process finally jumps according to a jump relationship between the nodes; and generating the recommended script according to the to-be-identified node.

9. The electronic device according to claim 7, wherein the forming the recommendation list with all script contents acquired comprises: ranking the script contents acquired according to a predetermined arrangement order of the corresponding subnodes in the subnodes of the to-be-identified node, and forming the recommendation list by the ranked script contents; and wherein the generating the recommended script according to the recommendation list comprises: generating the recommended script comprising all script content in the recommendation list, and a sequence of the script contents in the recommended script is the same as a ranking sequence of the script contents in the recommendation list.

10. The electronic device according to claim 9, wherein the method further comprises:

acquiring a second query input by the user in a next round dialogue after the current round dialogue, and determining subnodes matched with the second query in the subnodes meeting requirements;

increasing a number of hits corresponding to the subnodes matched with the second query, an initial number of hits of the subnodes meeting requirements being 0; and re-ranking the script contents in the recommendation list in a descending order of the number of hits.

11. The electronic device according to claim 7, wherein the acquiring the guide script corresponding to the first query comprises:

selecting randomly one guide script from at least one preset guide script as the guide script corresponding to the first query.

12. The electronic device according to claim 7, wherein the generating the reply corresponding to the first query according to the reply script, the guide script and the recommended script comprises:

splicing the reply script, the guide script and the recommended script to obtain the reply corresponding to the first query.

13. A non-transitory computer readable storage medium storing computer instructions for causing a computer to perform a multi-round dialogue processing method comprising:

acquiring a first query input by a user in a current round dialogue, and identifying an intention of the first query;

determining a scenario corresponding to the identified intention from scenarios corresponding to different intentions, determining a node matched with the first query in a pre-constructed node tree corresponding to the scenario, the node matched with the first query being a node with a node trigger condition matched with the first query, wherein the pre-constructed node tree includes multiple nodes organized in a tree structure, each node representing a business entity or a business attribute in a service flow in the scenario, with jump relationships between the nodes defining permissible transitions between the business entity and its associated business attributes in a multi-round dialogue, and each node processes a dialogue logic corresponding to the business entity or business attribute;

determining a recommended script according to the matched node, comprising:

determining a to-be-identified node from the matched node, determining whether the to-be-identified node meets a recommendation condition, wherein the recommendation condition is satisfied when the to-be-identified node comprises at least two subnodes that meet a requirement, wherein the requirement comprises at least one of: an intention corresponding to a subnode matching the intention of the first query, or an entity corresponding to a subnode matching an entity of the first query;

in response to the to-be-identified node meeting the recommendation condition, determining whether a recommendation list corresponding to the to-be-identified node is empty, in response to that the recommendation list corresponding to the to-be-identified node is empty, acquiring a script content corresponding to each of the at least two subnodes of the to-be-identified node, forming the recommendation list with all script contents acquired, and generating the recommended script according to the recommendation list; and in response to that the recommendation list corresponding to the to-be-identified node is not empty, generating the recommended script according to the recommendation list, wherein each node corresponds to a script content which is generated based on the node triggering condition of the node;

acquiring a reply script corresponding to the first query and a guide script corresponding to the first query, wherein the guide script is preset; and generating a reply corresponding to the first query according to the reply script, the guide script and the recommended script.

14. The non-transitory computer readable storage medium according to claim 13, wherein the determining the to-be-identified node from the matched node comprises:

if a number of the matched nodes is 1, taking the matched node as the to-be-identified node, and if the number of the matched nodes is greater than 1, taking the last node in the matched nodes as the to-be-identified node, the last node being a node to which a process finally jumps according to a jump relationship between the nodes; and generating the recommended script according to the to-be-identified node.

* * * * *